Oct. 27, 1959     G. G. JORIS     2,910,511
PROCESSES FOR THE PURIFICATION OF PHENOLS
Filed Dec. 10, 1956
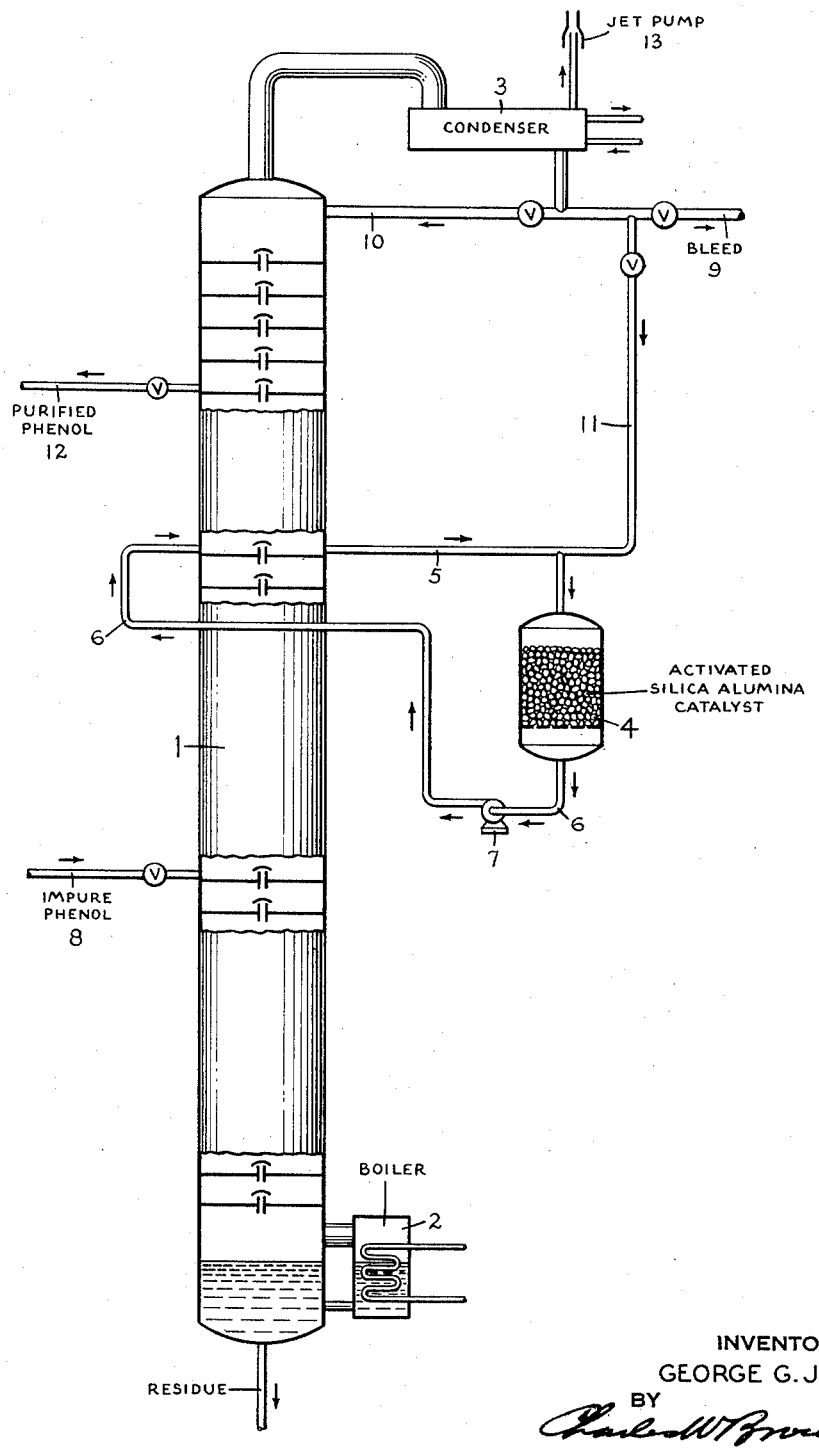
INVENTOR
GEORGE G. JORIS
BY
ATTORNEY United States Patent Office 2,910,511
Patented Oct. 27, 1959

2,910,511

PROCESSES FOR THE PURIFICATION OF PHENOLS

George G. Joris, Madison, N.J., assignor to Allied Chemical Corporation, a corporation of New York Application December 10, 1956, Serial No. 627,428

7 Claims. (Cl. 260—621)

This invention relates to an improvement in the processes for recovering a purified phenol by distillation of the product produced by oxidizing isopropylbenzenes or their nuclear methyl or halogen substituted derivatives by means of elemental oxygen to form the hydroperoxide, followed by decomposition of the hydroperoxide to form a phenol.

The production of a phenol, or methyl or halogen substituted phenol, by oxidizing the corresponding isopropylbenzene or nuclear substituted isopropylbenzene to the hydroperoxide by means of elemental oxygen, followed by decomposition of the hydroperoxide to form the phenol, are well known. Hereinafter, these processes will be referred to as the isopropylbenzene-hydroperoxide process. The hydroperoxide decomposition product contains numerous materials in addition to the phenol. These include, in addition to unreacted isopropylbenzene, materials such as ketones, beta-propylene benzenes and other impurities formed as by-products in the oxidation of the isopropylbenzene, in the decomposition of the hydroperoxide.

Heretofore it has been the practice to fractionally distill the hydroperoxide decomposition product, taking off a fraction containing the phenol product separated from lower and higher boiling constituents of the hydroperoxide decomposition product. Even with good rectification employed in these fractional distillations, the recovered phenol still contains small but undesirable amounts of genetic impurities, which term includes materials formed in the oxidation of the isopropylbenzene, decomposition of the resulting hydroperoxide and treatment of the decomposition product to recover the phenol. It is an object of my invention to provide a process whereby a phenol of high purity may be economically recovered by distillation of the hydroperoxide decomposition product.

Phenol has been produced by oxidizing cumene to cumyl hydroperoxide and decomposition of the hydroperoxide to phenol. A typical specification for industrial pure phenol requires that it pass the water solubility test. When it is to be used for certain purposes it must also pass the caustic solubility test. The water test involves dispersing the phenol in water in the weight ratio of 1 part phenol to 15 parts distilled water. To pass this test, the phenol must give a solution in the water which shows no turbidity or oil phase. The caustic solubility test involves dispersing the phenol in water in the weight ratio of 1 part of phenol to 19 parts of a 10% solution of caustic soda in water. To pass this test, the phenol must give a solution in the caustic medium which shows no turbidity or oil phase. These solubility tests are generally carried out at 25° C.

It is an object of my invention to provide a process for treating the cumyl hydroperoxide decomposition product containing genetic impurities, by an economical procedure especially effective for producing specification grade phenol with respect to the water or caustic solubility tests or both tests.

My invention is characterized by subjecting a phenol recovered from the isopropylbenzene-hydroperoxide decomposition product to contact with an activated silica-alumina catalyst and separating from the thus treated phenol compounds having boiling points substantially higher than the boiling point of the phenol, which have been formed by reaction of genetic impurities present in the phenol which is contacted with the activated silica-alumina catalyst.

A genetic impurity which I have found present in the phenols heretofore recovered from products of decomposing the isopropylbenzene hydroperoxides, is the beta-propylene benzene derivative of the isopropylbenzene which has been subjected to oxidation to the hydroperoxide and decomposition of the hydroperoxide. The presence of very small amounts of this impurity results in the phenol product not being of specification grade. My invention is especially effective in removing very small amounts of these beta-propylene benzene compounds from the phenol by converting them in to compounds which boil materially higher than the phenol. With their higher boiling points they are readily separable from the phenol by distillation or washing them out with a solvent, leaving a purified, specification grade phenol. The treatment of the phenol fraction with the activated silica-alumina catalyst and the separation of the higher boiling conversion products from the phenol may be carried out in two separate steps, or both may be carried out in one and the same step.

The catalysts suitable for use in carrying out my invention are the activated silica-alumina catalysts. Examples of these catalysts are those synthetically prepared from gels of the hydrated oxides or prepared by acid treatment of aluminum silicate clays of the bentonite type.

Whether liquid or vapors of the impure phenol are contacted with the catalyst, effective temperatures of this contact are in the range 50° to about 200° C. The time of contact will, of course, be dependent upon the relative activity of the catalyst and the temperature of its operation. High catalyst activity and high temperatures each tends to reduce the time of contact in order to accomplish the desired purification of the phenol.

Those products of the reactions of impurities present in the phenols which are solid at the temperature of contact with the catalyst tend to accumulate in the catalyst and impair its activity. The activity of the catalyst may be regenerated by washing with a solvent for the deposited material. I have found the phenol being treated is itself an excellent solvent when liquid for this purpose as well as for washing the reaction products of the catalytic treatment out of the treated phenol, whether those products are present as solid, liquid or vapors. Accordingly, in my preferred process, the catalyst and catalytically treated phenol are washed with liquid phenol to remove therefrom these reaction products.

The following examples more specifically illustrate and describe processes embodying my invention.

Example 1.—The accompanying drawing illustrates one procedure for operating in accordance with my invention.

With reference to the drawing, a distillation apparatus comprises a rectification column 1, a boiler 2 and a distillate condenser 3. A catalyst container 4 contains an activated silica-alumina catalyst. A pipe 5 leads from a plate in the upper portion of the fractionating column into the top of catalyst container 4. By means of piping 6 and pump 7, a liquid side stream is drawn off from the fractionating column through pipe 5, passed in contact with the catalyst in container 4 and returned to the same plate of rectification column 1 from which the side stream is withdrawn.

The impure phenol fraction is introduced through pipe 8 to a plate in the mid-portion of the rectification column. The overhead vapors from the column are condensed in condenser 3. A part of the liquid condensate is drawn off through pipe 9 to carry with it materials having a boiling point below that of the phenol. Another portion of the condensate is passed through pipe 10 into the top of column 1 in amount sufficient to provide the reflux for the top of the column. The remainder of the condensate is passed through pipe 11 and mixed with the side stream contacted with the catalyst in container 4. A purified phenol distillate is taken off as a side stream withdrawn through pipe 12 from a point of column 1 between the point from which the side stream passed in contact with the catalyst is taken off and the top of the column. The higher boiling compounds formed by reaction of impurities present in the feed to the column by contact with the catalyst, are withdrawn in the residue of the distillation taken off from the bottom of column 1. A jet pump 13 serves to maintain a reduced pressure in the distillation apparatus.

Cumene is oxidized with air to form cumene hydroperoxide and the hydroperoxide is decomposed to form phenol by treating the oxidation product with sulfur dioxide. The hydroperoxide decomposition product is first distilled to remove fractions containing acetone, cumene and alpha-methyl styrene. Employing the distillation apparatus of the drawing first without catalyst container 4 and pipes 5, 6 and 11 and pump 7 associated therewith, hence not utilizing my invention, the bottoms from these distillations of the hydroperoxide decomposition product obtained by treating with sulfur dioxide the product of the air oxidation of cumene, which bottoms contain phenol accompanied by genetic impurities, are fed through pipe 8 into column 1 on the 11th plate, counting from the bottom of the column. In flowing downwardly through the bottom of the column, phenol in the feed to the column is vaporized. Phenol vapors are carried upwardly through the upper portion of the column, condensed in the condenser and in large part returned as reflux to the top of the column. The other portion of the condensate is drawn off through pipe 9. The phenol product of the process is drawn off through pipe 12 from plate 26. The reflux of phenol descending as liquid through the upper portion of the column below is rectified therein, with the phenol being again vaporized and carried upwardly while higher boiling components descend through the lower portion of the column and are drawn off in the residue of this distillation.

As thus operated, in order to obtain a phenol which passed the above solubility tests, it required an inordinately high rate of withdrawal of bleed from the top of the column through pipe 9. Depending upon whether the product was to pass the water solubility test or also was to pass the more rigorous caustic solubility test, and on variations in the composition of the feed to column 1, the volume of bleed taken off amounted to 20% and more of the feed to column 1. This bleed was recycled to the distillation in which cumene was removed and placed a heavy burden on this distillation as well as on all the subsequent distillations for recovery of the phenol product.

The apparatus was then modified to that shown in the drawing in which the process of my invention was carried out. Catalyst container 4 was provided and packed with 450 lbs. of an activated silica-alumina catalyst prepared from gels of the hydrated oxides, purchased on the market under the trade name of "Houdry catalyst M–46." Pipes 5 and 6 and pump 7 were provided for circulating liquid drawn from plate 21, passing it through container 4 in contact with the catalyst and returning it to plate 21. Pipe 11 was provided for passing a part of the condensate from condenser 3 into the liquid drawn from plate 21 and passed in contact with the catalyst in container 4.

With these modifications in the apparatus, the process embodying my invention is carried out as follows: The feed, the bottoms from the distillations of the hydroperoxide decomposition product obtained by oxidizing cumene with air and decomposing the cumene hydroperoxide by treating the oxidation product with sulfur dioxide, which bottoms contain phenol accompanied by genetic impurities, is introduced to plate 11 at the rate of 621 gals./hr. and distilled under a reduced pressure of 60 mm. Hg absolute in the top of column 1. Temperatures of 157° C. in the bottom of the column and 110° C. in the top of the column are maintained. Liquid condensate from condenser 3 is returned as reflux to the top of the column at the rate of 1230 gals./hr.; 50 gals./hr. passed through pipe 11; and 450 gals./hr. of liquid phenol are drawn from plate 21 through pipe 5, passed in contact with the catalyst in container 4 and then returned to this same plate of the column. In container 4 the liquid is contacted with the catalyst at about 118° C. To prevent accumulation in the top of the column of residual material boiling below phenol present in the feed, a bleed of 46 gals./hr. of condensate from condenser 3 is drawn off from pipe 9. Residue is drawn from the bottom of column 1 at the rate of 65 gals./hr. Liquid is drawn from plate 26 through pipe 12 at the rate of 510 gals./hr. as a purified phenol which passes both the water and caustic solubility tests for specification grade phenol.

Impurities in the phenol fraction drawn from plate 21 to contact with the catalyst in container 4 are converted to compounds with materially higher boiling points than that of phenol. The phenol containing these impurities returned to the column is distilled. The phenol is vaporized and carried into the distillate drawn off as purified phenol and in the bleed from the top of the column. The higher boiling compounds pass downwardly in the liquid flowing to the bottom of the column and are withdrawn in the residue of the distillation. In thus operating in accordance with my invention, the bleed from the top of the column is reduced to only one-third to one-fourth that required when operating in the manner first described in this example.

As pointed out above, a genetic impurity commonly present in the phenol fraction recovered from the hydroperoxide decomposition product in the isopropyl-benzene-hydroperoxide process for the production of a phenol, is the beta-propylene derivative of the isopropyl-benzene supplied to the process. I have found that the process of my invention is effective to remove this impurity so that the product meets the tests for a specification phenol. This feature of my process as well as its use in treating a commercially produced phenol, is illustrated by the following example.

*Example 2.*—A rectification column provided with a boiler at its bottom and condenser for the vapors from the top of the column, is packed with Penn State stainless steel packing in the lower one-half and top one-third of its height. Between these packed portions of the column, it contains for one-sixth of the column height a bed of activated silica-alumina catalyst purchased under the trade name of "Houdry catalyst type M."

Phenol containing 1% alpha-methyl styrene is introduced into the boiler and continuously distilled under about 30 mm. Hg abs. Temperatures maintained are about 100°–105° C. in the boiler, 95°–100° C. in the catalyst bed and about 95° C. at the top of the column. The column is operated with a reflux ratio of about 1/1 by volume of reflux to withdrawn distillate. Distillate product thus obtained passes both the water and caustic solubility tests for specification grade phenol.

In thus operating, vapors of phenol accompanied by alpha-methyl styrene pass upwardly in contact with the catalyst. Alpha-methyl styrene reacts to form high boiling material as compared with the boiling point of phenol. This material is largely washed out of the phenol vapors by the liquid phenol reflux passing downwardly through the catalyst bed. Any residual high boiling material entrained in the vapors leaving the catalyst bed is washed out by the liquid phenol reflux in the top section of the column containing the Penn State packing. The high boiling material thus separated from the phenol vapors is carried into the residue drawn from the bottom of the column.

Distillation in the same apparatus and under the same conditions of a commercially produced phenol fraction from the cumene-hydroperoxide process which failed to pass even the water solubility test, gave phenol which passed both the water and caustic tests.

Example 3.—A solution of 1% of alpha-methyl styrene in phenol is mixed with 6.7% of its weight of suifuric acid treated clay of the bentonite type. The comminuted catalyst is stirred with the phenol for 1 hour at 100° C. The thus treated material is fractionally distilled. The phenol recovered as overhead distillate product passes the water solubility test for specification phenol.

Example 4.—Phenol containing 1% alpha-methyl styrene is passed upwardly through a tube containing a stirred suspension of sulfuric acid treated clay of the bentonite type. The feed rate of the phenol is controlled to give a contact time of 10–15 mins. in the portion of the tube containing the suspended catalyst. The temperature is maintained at 100° C. The liquid leaving the top of the tube is fractionally distilled. An overhead distillate which passes the caustic solubility test for specification grade phenol is obtained.

Example 5.—In an apparatus similar to that used in Example 2, 4-cresol containing 1% of 4-methyl-alpha-methyl styrene is introduced into the boiler of the rectification column and continuously distilled under 30 mm. Hg abs. Temperatures maintained are about 123° C. in the boiler, 118° C. in the catalyst bed and about 113° C. at the top of the column. The column is operated with a reflux ratio of about 1 to 1. The distillate product thus obtained is free of 4-methyl-alpha-methyl styrene by mass spectrographic analysis.

Example 6.—In an apparatus similar to that used in Example 2, 4-fluorophenol containing 1% of 4-fluoro-alpha-methyl styrene is introduced into the boiler of the rectification column and continuously distilled under 30 mm. Hg abs. Temperatures maintained are about 105° C. in the boiler, 100° C. in the catalyst bed and about 95° C. at the top of the column. The column is operated at a reflux ratio of 1 to 1. The 4-fluorophenol distillate thus obtained is free of its contaminant by mass spectrographic analysis.

I claim:

1. In the production of a phenol by an isopropylbenzene-hydroperoxide process wherein a member of the group consisting of the isopropylbenzenes and their nuclear methyl and halogen substituted derivatives is oxidized by elemental oxygen to the hydroperoxide, the hydroperoxide is decomposed to form a phenol, and (1) the hydroperoxide decomposition product is distilled with separation of the phenol accompanied by genetic impurities from lower boiling materials, and (2) the phenol accompanied by genetic impurities is distilled with rectification of the vapors of phenol evolved in this distillation by contact with liquid phenol reflux condensed from the evolved vapors and a purified liquid phenol is taken off as a distillate product separated from higher boiling materials, that improvement which comprises (3) contacting the phenol which has been separated from lower boiling materials but while it is still accompanied by at least a substantial portion of said genetic impurities, with an activated silica-alumina catalyst to convert said genetic impurities into conversion products boiling at temperatures substantially higher than the boiling point of said phenol and washing the catalyst with liquid phenol to remove from the catalyst said conversion products, and (4) distilling the liquid phenol containing said conversion products with rectification of the evolved vapors by contact with liquid phenol reflux, and withdrawing from the distillation of the phenol accompanied by genetic impurities and from the distillation of the phenol containing the conversion products of genetic impurities washed from said catalyst, purified specification grade phenol as distillate and residue containing higher boiling materials, including said conversion products.

2. The process of claim 1 in which the product of the oxidation of cumene to cumyl hydroperoxide and decomposition of the cumyl hydroperoxide to monohydroxybenzene is supplied to step (1) and specification grade monohydroxybenzene is withdrawn as a distillate product of said process.

3. The process of claim 1 in which the catalyst is prepared from a gel of hydrated oxides of silica and alumina.

4. The process of claim 1 in which the catalyst is an acid treated clay of the bentonite type.

5. The process of claim 1 in which both the vapors of phenol undergoing rectification and the liquid phenol reflux contacted therewith in distilling the phenol accompanied by genetic impurities in step (2) are contacted with the silica-alumina catalyst whereby said genetic impurities are converted into higher boiling conversion products and washed from the catalyst by the liquid phenol reflux as called for by step (3), and distilling the liquid phenol reflux containing said conversion products together with the feed to distillation step (4) and passing the vapors evolved by this distillation to step (2) wherein they are rectified and are contacted with said catalyst, whereby the purified specification grade phenol is taken off as distillate from step (2) and the residue containing higher boiling materials, including said conversion products, is taken off from step (4).

6. The process of claim 1 in which liquid phenol reflux containing genetic impurities contacted with the vapors of phenol in the distillation of step (2) is taken off as a side stream at an intermediate point of this distillation between the point of feeding the phenol thereto and withdrawing the purified liquid phenol therefrom, contacting this side stream of liquid phenol with the catalyst in step (3) to convert said genetic impurities into higher boiling conversion products and to wash those conversion products out of the catalyst, and returning the liquid reflux containing said conversion products into contact with the vapors of phenols in step (2) whereby the phenol feed to step (2) and the liquid reflux containing said conversion products are distilled together in step (4) to vaporize phenol which is recovered in the purified liquid phenol distillate product to step (2) separated from a residue containing higher boiling materials, including said conversion products, which is withdrawn from step (4).

7. The process of claim 6 in which residual material boiling lower than the phenol, including genetic impurities, is present in the phenol subjected to distillation in step (2) and is carried overhead into the condensate of liquid phenol reflux, returning a part of said condensate directly to said distillation as reflux, contacting another part of said condensate with the catalyst in step (3) and thence returning it to said distillation, and drawing off another part of said condensate as bleed from the distillation in amount such that (in parts by weight) one part of the purified liquid phenol taken off as distillate product in step (2) in 15 parts distilled water and one part of said purified liquid phenol in 19 parts of a 10 percent solution of caustic soda in water give solutions showing no turbidity or oil phase.

References Cited in the file of this patent

UNITED STATES PATENTS

| | | |
|---|---|---|
| 2,077,494 | Smoley | Apr. 20, 1937 |
| 2,105,499 | Parsons | Jan. 18, 1938 |
| 2,728,795 | Armstrong et al. | Dec. 27, 1955 |
| 2,785,205 | Jacobs | Mar. 12, 1957 |